United States Patent [19]
Richards

[11] 3,930,116
[45] Dec. 30, 1975

[54] ELECTRIC OUTLET FACE PLATES OR COVERS

[76] Inventor: Theodore W. Richards, 1936 Sloat Blvd., San Francisco, Calif. 94116

[22] Filed: Sept. 18, 1973

[21] Appl. No.: 398,385

[52] U.S. Cl. .................. 174/66; 220/241; 339/105; 339/119 C; 339/123
[51] Int. Cl.² .......................................... H02G 3/14
[58] Field of Search ...... 174/66, 67; 220/24.2, 24.3; 339/119 C, 123, 106, 105, 75 P

[56] References Cited
UNITED STATES PATENTS
2,084,953  6/1937  Gibson .............................. 220/24.2
3,102,922  9/1963  Lashmutt .................... 339/119 C X

*Primary Examiner*—J. V. Truhe
*Assistant Examiner*—David A. Tone
*Attorney, Agent, or Firm*—Gardiner, Sixbey, Bradford and Carlson

[57] ABSTRACT

The present invention relates to an improvement in the face plates or covers of electric connectors of the plug and socket type wherein an electric cord has attached to one end thereof a plug adapted for insertion into electric contact with a selected outlet socket and has its opposite end connected to an electrically-operated accessory, and in which said face plate or cover is provided with a pair of cooperating hook-like structures, a single hook, or plate, a bar or like device placed adjacent each outlet socket which prevents the cord and plug from dropping downwardly when said plug is disconnected from its cooperating socket, and which prevents a direct outward pull on the plug when inserted into said outlet socket to prevent unintentional disconnection of said plug from its cooperating outlet socket.

1 Claim, 7 Drawing Figures

ELECTRIC OUTLET FACE PLATES OR COVERS

BACKGROUND OF THE INVENTION

One or more electric outlet sockets are generally placed at a convenient location on a wall, base-board, floor, or ceiling, and are adapted to receive and to establish electrical contact with a plug connected to an electric cord leading to an electrically-operated accessory such as a lamp, tool, percolator, vacuum cleaner, floor polisher or the like. When said outlet sockets are positioned on a wall or ceiling and the plug is withdrawn from its cooperating outlet socket, said cord and plug drop downwardly to the floor. In the prior art, there is always a direct outward pull on the plug as the electrically operated accessory is being operated, especially when the connection is made with portable accessories such as electrically operated tools, vacuum cleaners, floor, polishers or the like. By the present invention, the cord or plug are prevented from dropping to the floor when its plug is disconnected from its cooperating outlet socket, and since the hook-like structure, plate, bar or other cord and plug retaining means is disposed in spaced, adjacent position with respect to the outlet socket, a direct outward pull on said plug which would result in unintentional disconnection of the plug from its cooperating outlet socket is prevented. The effectiveness and efficiency of the present invention is therefor readily apparent.

BRIEF DESCRIPTION OF THE DRAWINGS

In the accompanying drawings forming a part of the present application, several preferred embodiments of the said invention are shown, like reference numerals being employed to designate like parts throughout the several figures, and wherein.

DESCRIPTION OF THE PREFERRED EMBODIMENTS

Figure 1:
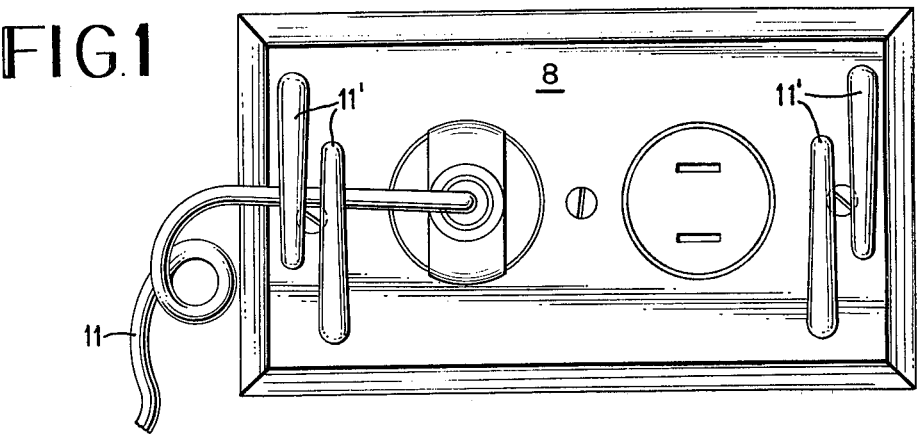
FIG. 1 is a plan view of the face plate of a double outlet socket showing one form of the present invention applied thereto.
Figure 2:
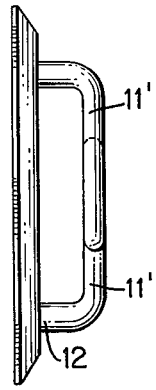
FIG. 2 is a side view of the device shown in FIG. 1.

In FIGS. 1 and 2 of the accompanying drawings there is shown a face plate 8 of any preferred construction, covering two plug-in type outlet sockets into which the contacts 9 of a connecting plug 10 connected to one end of an electric cord 11, may be inserted. To one side of and adjacent each of the outlet sockets there is provided a pair of retaining members $11^1$, each of which is of L-shape configuration having one end 12 thereof secured to or formed integrally with face plate 8, the uppermost one of said members $11^1$ extending downwardly and the other thereof extending upwardly in horizontally-spaced relative with respect to said first mentioned member $11^1$. The distance between the said members $11^1$ and the surface of face plate 8 is greater than the diameter of cord 11 but is considerably less than the diameter of connecting plug 10.

Figure 3:
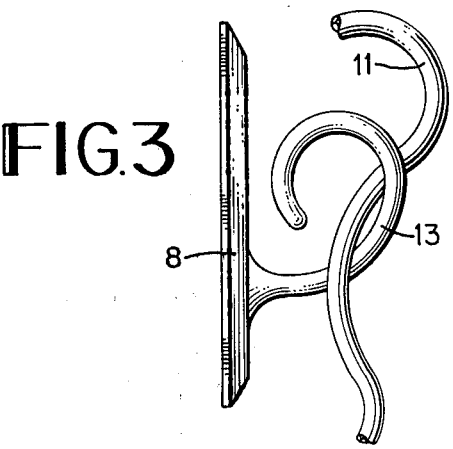
FIG. 3 is a side view of a face plate provided with a hook-like device which is positioned to one side of and adjacent an outlet socket.

In FIG. 3 of the accompanying drawings there is shown a vertically positioned hook-shaped member 13 having one end attached to or formed integrally with face plate 8, the internal diameter of which hook-shaped member 13 is greater than the diameter of cord 11 but is considerably less than the diameter of connecting plug 10.

Figure 4:
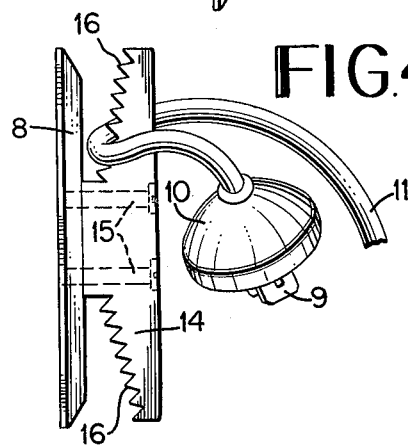
FIG. 4 is a side view of a face plate provided with a vertically positioned bar secured to the face plate to one side and adjacent an outlet socket.
Figure 5:
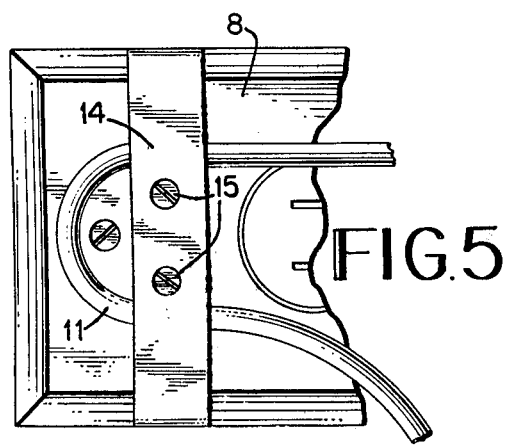
FIG. 5 is a fragmentary plan view of the form of the present invention shown in FIG. 4.
Figure 6:
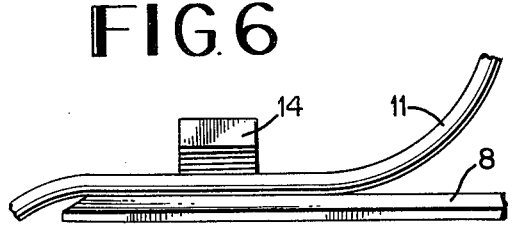
FIG. 6 is a fragmentary view looking downwardly upon the form of the present invention shown in FIGS. 4 and 5.
Figure 7:
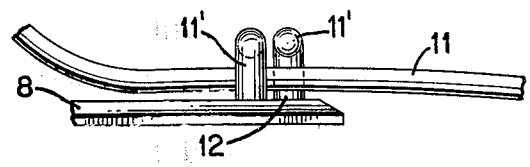
FIG. 7 is a fragmentary view looking downwardly upon the form of the present invention shown in FIGS. 1 and 2.

In FIGS. 4, 5 and 6 of the accompanying drawings there is shown a vertically positioned bar 14 secured at its mid-portion to face plate 8 by means of screws 15, said bar 14 having on the inner surface thereof a plurality of horizontally extending serrations 16 for a purpose to be hereinafter described, the inner serrated surfaces of said bar 14 being inclined outwardly from the mid-portion thereof as clearly shown in FIGS. 4 and 6.

Referring now to the operation and utility of the several forms of the present invention referred to in detail above, and with particular references to that form of the invention shown in FIGS. 1 and 2 of the accompanying drawings, the electric cord 11 is placed within the confines of the members $11^1$ by passing the cord beneath the lower end of the left-hand member $11^1$ and the upper end of the right-hand member $11^1$ and the plug 10 is inserted into the adjacent outlet socket. When thus connected, that portion of the cord 11 adjacent plug 10 is disposed parallel to the plane of face plate 8 so that any outward pull on the cord 11 will not be a direct outward pull on the plug 10 which would tend to unintentionally disconnect said plug 10 from its cooperating outlet socket. When the cord 11 has served its intended purpose and is disconnected from its cooperating outlet socket, said cord and plug will not fall to the floor as the diameter of a said plug is greater than the distance between the inner surfaces of member $11^1$ and the surface of face plate 8.

When employing the form of the invention shown in FIG. 3 of the accompanying drawings, the hook 13 has its upper portion spaced from the surface of face plate 8 a sufficient distance to permit the cord 11 to be passed downwardly and into the interior portion of said hook 13 and since the internal diameter of said hook 13 is less than the diameter of plug 10, the cord 11 and plug 10 cannot, when said plug 10 is disconnected from its cooperating outlet socket, fall to the floor.

When employing the form of the invention shown in FIGS. 4, 5 and 6 of the accompanying drawings, the cord 11 when the plug 10 is disconnected from its cooperating outlet socket is disposed in the space between the inner serrated surface 16 and the surface of face plate 8, which distance is less than the diameter of plug 10, in view of which said plug and cord are prevented from dropping to the floor. When said plug 10 is inserted into its cooperating outlet socket, cord 11 is passed through the space between the inner uppermost serrated portion of bar 14 and then through the space between the inner lowermost serrated portion of bar 14, as clearly shown in FIG. 5. This construction and operation, like the forms previously described, prevents a direct outward pull on cord 11 when said plug is inserted into its cooperating outlet socket, thus preventing unintentional disconnection between the same.

While I have elected to illustrate and describe the present invention as applied to a face plate, it is to be understood that the present invention is applicable to a wall, or cover of an electric outlet box placed on a base-board, floor or ceiling. It is also to be understood that the several forms of the present invention illustrated and described herein are to be taken as preferred embodiments of said invention and that various changes in the shape, size and arrangement of parts may be made without departing from the spirit of the present invention or from the scope of the subjoined claims.

Having thus described my invention, I claim:

1. A one-piece face plate for an electric outlet of a conventional plug and socket type electrical connector, said face plate having at least one opening therein and being adapted to overlie the outlet when said face plate is secured in place thereon with said opening exposing said socket, said face plate having plug and wire retaining and guiding means formed integrally therewith, said means being positioned between a side of said opening disposed toward an edge of said plate proximate said opening, said means including a pair of substantially L-shaped members arranged in a parallel spaced relation, with each having one end thereof formed integrally with said face plate, said L-shaped members having the free portions thereof extending in opposite directions from their ends and in side by side overlapping relationship to one another, and each being spaced substantially equally from and substantially parallel to the plane of said face plate, said wire underlying said free portions with said plug being retained thereby, a portion of a said wire leading to and adjacent said plug being maintained in substantially parallel relation to the plane of said face plate, and extending outwardly from said plug toward said proximate edge of said plate, the arrangement serving to prevent a direct outward pull on said plug with respect to said plate which would tend to unintentionally disconnect said plug from its cooperating socket, and said plug being prevented from passing between said face plate and said members when said plug is disconnected from its cooperating socket.

* * * * *